United States Patent
Taylor et al.

(10) Patent No.: US 10,934,943 B2
(45) Date of Patent: Mar. 2, 2021

(54) COMPRESSOR APPARATUS WITH BLEED SLOT AND SUPPLEMENTAL FLANGE

(71) Applicant: General Electric Company, Schenectady, NY (US)

(72) Inventors: Steven Mitchell Taylor, West Chester, OH (US); Vishnu Das K, Bangalore (IN); Manish Singhal, Bangalore (IN); Atanu Saha, Bangalore (IN); Michael Anthony Thomas, Union, KY (US)

(73) Assignee: General Electric Company, Schenectady, NY (US)

( * ) Notice: Subject to any disclaimer, the term of this patent is extended or adjusted under 35 U.S.C. 154(b) by 655 days.

(21) Appl. No.: 15/499,743

(22) Filed: Apr. 27, 2017

(65) Prior Publication Data
US 2018/0313276 A1    Nov. 1, 2018

(51) Int. Cl.
*F02C 6/08*     (2006.01)
*F02C 9/18*     (2006.01)
(Continued)

(52) U.S. Cl.
CPC ............... *F02C 9/18* (2013.01); *F02C 3/06* (2013.01); *F02C 6/08* (2013.01); *F02K 3/02* (2013.01);
(Continued)

(58) Field of Classification Search
CPC ..................................... F02C 6/08; F02K 3/02
See application file for complete search history.

(56) References Cited

U.S. PATENT DOCUMENTS 3,632,223 A * 1/1972 Hampton ............... F04D 29/522
                                                 415/144
3,945,759 A * 3/1976 Bobo ................... F04D 27/0215
                                                 415/145
(Continued)

FOREIGN PATENT DOCUMENTS

GB          936635 A  *  9/1963

OTHER PUBLICATIONS

Chinese Patent Office, "Second Office Action and Search Report," issued in connection with Chinese Patent Application No. 201810391095.2, dated May 8, 2020, 13 pages.

*Primary Examiner* — Gerald L Sung
*Assistant Examiner* — Marc J Amar
(74) *Attorney, Agent, or Firm* — Hanley, Flight & Zimmerman, LLC

(57) ABSTRACT

A compressor bleed slot apparatus includes: an annular compressor casing; a stator vane row disposed inside the compressor casing; a blade row mounted for rotation about a centerline axis inside the compressor casing, axially downstream of the stator row; a bleed slot passing through the compressor casing, wherein the bleed slot is bounded by inboard and outboard walls defined within the compressor casing, the bleed slot having an inlet positioned axially between the stator vane row and the blade row, the bleed slot extending along a slot axis, at least a portion of the bleed slot lying within an axial extent of the blade row; an annular array of struts interconnecting the inboard and outboard walls; and an annular supplemental flange extending radially outward from the compressor casing, wherein at least a portion of the supplemental flange is axially positioned within an axial extent of the bleed slot.

16 Claims, 4 Drawing Sheets

(51) Int. Cl.
*F02C 3/06* (2006.01)
*F04D 29/54* (2006.01)
*F02K 3/02* (2006.01)

(52) U.S. Cl.
CPC ......... *F04D 29/545* (2013.01); *F04D 29/547* (2013.01); *F05D 2220/32* (2013.01); *F05D 2240/12* (2013.01); *F05D 2240/14* (2013.01)

(56) References Cited

U.S. PATENT DOCUMENTS

| | | | |
|---|---|---|---|
| 3,976,394 A * | 8/1976 | Tarter | F04D 27/0215 415/144 |
| 4,101,242 A * | 7/1978 | Coplin | F01D 11/18 415/134 |
| 4,463,552 A | 8/1984 | Monhardt et al. | |
| 4,711,084 A | 12/1987 | Brockett | |
| 4,844,689 A | 7/1989 | Seed | |
| 5,154,575 A * | 10/1992 | Bonner | F01D 11/18 415/134 |
| 5,155,993 A | 10/1992 | Baughman et al. | |
| 5,160,248 A | 11/1992 | Clarke | |
| 5,203,162 A | 4/1993 | Burge | |
| 5,209,633 A | 5/1993 | McGreehan et al. | |
| 5,231,825 A * | 8/1993 | Baughman | F04D 27/0215 60/204 |
| 5,279,109 A | 1/1994 | Liu et al. | |
| 5,380,151 A | 1/1995 | Kostka et al. | |
| 5,380,155 A | 1/1995 | Varsik et al. | |
| 5,458,343 A | 10/1995 | Dornfeld et al. | |
| 5,649,419 A | 7/1997 | Schaut | |
| 6,086,326 A | 7/2000 | Honda et al. | |
| 6,092,987 A | 7/2000 | Honda et al. | |
| 6,106,227 A | 8/2000 | Honda et al. | |
| 6,109,868 A * | 8/2000 | Bulman | F01D 17/105 415/144 |
| 6,141,951 A | 11/2000 | Krukoski et al. | |
| 6,148,518 A | 11/2000 | Weiner et al. | |
| 6,161,839 A | 12/2000 | Walton et al. | |
| 6,203,273 B1 | 3/2001 | Weiner et al. | |
| 6,325,595 B1 * | 12/2001 | Breeze-Stringfellow | F01D 17/10 415/144 |
| 6,428,271 B1 * | 8/2002 | Ress, Jr. | F01D 5/022 415/169.1 |
| 6,438,941 B1 | 8/2002 | Elliot et al. | |
| 6,561,760 B2 | 5/2003 | Wadia et al. | |
| 6,619,913 B2 | 9/2003 | Czachor et al. | |
| 6,622,475 B2 * | 9/2003 | Brault | F01D 17/105 60/226.3 |
| 6,663,346 B2 | 12/2003 | Munsell et al. | |
| 6,783,324 B2 * | 8/2004 | Muny | F01D 25/246 415/116 |
| 6,802,691 B2 * | 10/2004 | Chlus | F01D 17/141 415/145 |
| 6,899,513 B2 | 5/2005 | Eleftheriou | |
| 6,986,638 B2 | 1/2006 | Austin et al. | |
| 7,025,563 B2 | 4/2006 | Servadio et al. | |
| 7,210,295 B2 | 5/2007 | McEwen | |
| 7,249,929 B2 | 7/2007 | Cummings et al. | |
| 7,284,955 B2 * | 10/2007 | Vieillefond | F01D 25/246 415/190 |
| 7,493,770 B2 | 2/2009 | Christianson et al. | |
| 7,624,581 B2 | 12/2009 | Moinz | |
| 7,708,519 B2 | 5/2010 | Mignano | |
| 7,785,066 B2 | 8/2010 | Bil et al. | |
| 7,850,419 B2 | 12/2010 | Vrljes et al. | |
| 7,946,104 B2 | 5/2011 | Frank et al. | |
| 8,066,479 B2 | 11/2011 | El-Aini et al. | |
| 8,191,254 B2 * | 6/2012 | Cardarella, Jr. | F01D 21/045 29/889.2 |
| 8,220,276 B2 * | 7/2012 | Clemen | F01D 17/105 415/199.5 |
| 8,292,567 B2 | 10/2012 | Damle et al. | |
| 8,336,317 B2 | 12/2012 | Blanchard et al. | |
| 8,388,308 B2 | 3/2013 | Karafillis et al. | |
| 8,402,770 B2 | 3/2013 | Garin et al. | |
| 8,734,091 B2 * | 5/2014 | Moniz | F01D 17/105 415/144 |
| 8,893,512 B2 | 11/2014 | Donahoo et al. | |
| 9,322,337 B2 | 4/2016 | Little et al. | |
| 9,438,941 B2 | 9/2016 | Collins et al. | |
| 10,066,633 B2 * | 9/2018 | Wunderer | F04D 19/00 |
| 10,107,194 B2 * | 10/2018 | Lahmer | F01D 17/16 |
| 10,125,781 B2 * | 11/2018 | Klasing | F04D 27/009 |
| 2002/0148216 A1 * | 10/2002 | Brault | F01D 17/105 60/226.1 |
| 2004/0033133 A1 * | 2/2004 | Muny | F01D 25/246 415/175 |
| 2004/0096315 A1 * | 5/2004 | Chlus | F01D 17/141 415/145 |
| 2005/0106009 A1 | 5/2005 | Cummings et al. | |
| 2005/0135928 A1 | 6/2005 | Servadio et al. | |
| 2007/0196204 A1 * | 8/2007 | Seitz | F01D 11/08 415/144 |
| 2008/0115504 A1 | 5/2008 | Martensson et al. | |
| 2008/0199301 A1 | 8/2008 | Cardarella, Jr. | |
| 2008/0232951 A1 | 9/2008 | Cardarella | |
| 2009/0180872 A1 | 7/2009 | Lundgren | |
| 2009/0188257 A1 | 7/2009 | Kirby | |
| 2009/0297335 A1 * | 12/2009 | Karafillis | F01D 17/105 415/115 |
| 2009/0301102 A1 | 12/2009 | Clemen et al. | |
| 2010/0043447 A1 | 2/2010 | Kirby | |
| 2010/0275613 A1 * | 11/2010 | Alasti | F01D 11/24 60/785 |
| 2011/0016877 A1 | 1/2011 | Nichols et al. | |
| 2011/0154830 A1 | 6/2011 | Bowman et al. | |
| 2012/0275912 A1 * | 11/2012 | Moniz | F01D 17/105 415/199.5 |
| 2013/0098062 A1 | 4/2013 | Donahoo et al. | |
| 2013/0340440 A1 | 12/2013 | LeBlanc et al. | |
| 2013/0340441 A1 * | 12/2013 | Little | F02C 9/18 60/785 |
| 2014/0096536 A1 | 4/2014 | Travis et al. | |
| 2014/0311157 A1 | 10/2014 | Laurello et al. | |
| 2015/0132115 A1 * | 5/2015 | Wunderer | F04D 19/00 415/169.1 |
| 2015/0159551 A1 * | 6/2015 | Lahmer | F01D 17/16 415/145 |
| 2015/0369133 A1 * | 12/2015 | Bogue | C23C 4/11 251/12 |
| 2016/0123187 A1 | 5/2016 | Leslie et al. | |
| 2016/0123235 A1 * | 5/2016 | Siering | F02C 9/18 415/1 |
| 2017/0191484 A1 * | 7/2017 | Klasing | F04D 27/009 |
| 2017/0254274 A1 * | 9/2017 | Thomas, Jr. | F01D 17/145 |

* cited by examiner

COMPRESSOR APPARATUS WITH BLEED SLOT AND SUPPLEMENTAL FLANGE

BACKGROUND OF THE INVENTION

This invention relates generally to compressors in gas turbine engines, and more particularly relates to bleed slots in such compressors.

A gas turbine engine includes, in serial flow communication, a compressor, a combustor, and turbine. The turbine is mechanically coupled to the compressor and the three components define a turbomachinery core. The core is operable in a known manner to generate a flow of hot, pressurized combustion gases to operate the engine as well as perform useful work such as providing propulsive thrust or mechanical work.

Within at least some known gas turbine engines, a portion of high-pressure air is extracted or bled from the compressor for other uses such as for turbine cooling, pressurizing bearing sumps, purge air, or aircraft environment control. This "bleed air" is bled off from the compressor using bleed slots located in specific portions or stages of the compressor. The extracted air is then supplied to the various locations that need the air via bleed ports located around the outer periphery of the engine.

The compressor has multiple stages and the static pressure at each subsequent stage is higher than the upstream stage, with the final stage discharging air at the intended compressor discharge pressure ("CDP"). Each stage represents the investment of incrementally more mechanical work.

One problem with bleed air extraction is that it is "expensive" to the engine cycle, increasing fuel burn and specific fuel consumption ("SFC"), an important metric of efficiency. It is desired to extract or bleed air from the lowest stage possible while still satisfying the requirements of the bleed air end use. However, pressure losses in the bleed system can drive the need to use air from a higher stage than desired.

Another problem with bleed air extraction is that the configuration of bleed air slots for best aerodynamic efficiency may cause adverse structural and thermomechanical effects on the compressor.

BRIEF DESCRIPTION OF THE INVENTION

This problem is addressed by a compressor which incorporates a low-angle bleed slot in combination with a supplemental flange to control the thermal response of the compressor casing.

According to one aspect of the technology described herein, a compressor bleed slot apparatus includes: an annular compressor casing; a stator vane row disposed inside the compressor casing; a blade row mounted for rotation about a centerline axis inside the compressor casing, axially downstream of the stator row; a bleed slot passing through the compressor casing, the bleed slot having an inlet positioned axially between the stator vane row and the blade row, wherein the bleed slot is bounded by inboard and outboard walls defined within the compressor casing, the bleed slot extending along a slot axis, at least a portion of the bleed slot lying within an axial extent of the blade row; an annular array of struts interconnecting the inboard and outboard walls; and an annular supplemental flange extending radially outward from the compressor casing, wherein at least a portion of the supplemental flange is axially positioned within an axial extent of the bleed slot.

According to another aspect of the technology described herein, a gas turbine engine apparatus includes: a compressor, a combustor, and a turbine arranged in serial flow relationship, wherein the compressor includes: an annular compressor casing; a stator row disposed inside the compressor casing; a blade row mounted for rotation about a centerline axis inside the compressor casing, axially downstream of the stator row, and mechanically coupled to the turbine; a bleed slot passing through the compressor casing, wherein the bleed slot is bounded by inboard and outboard walls defined within the compressor casing, the bleed slot having an inlet positioned axially between the stator row and the blade row, the bleed slot extending along a slot axis, at least a portion of the bleed slot lying within an axial extent of the blade row; an annular array of struts interconnecting the inboard and outboard walls; and an annular supplemental flange extending radially outward from the compressor casing, wherein at least a portion of the supplemental flange is axially positioned within an axial extent of the bleed slot.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
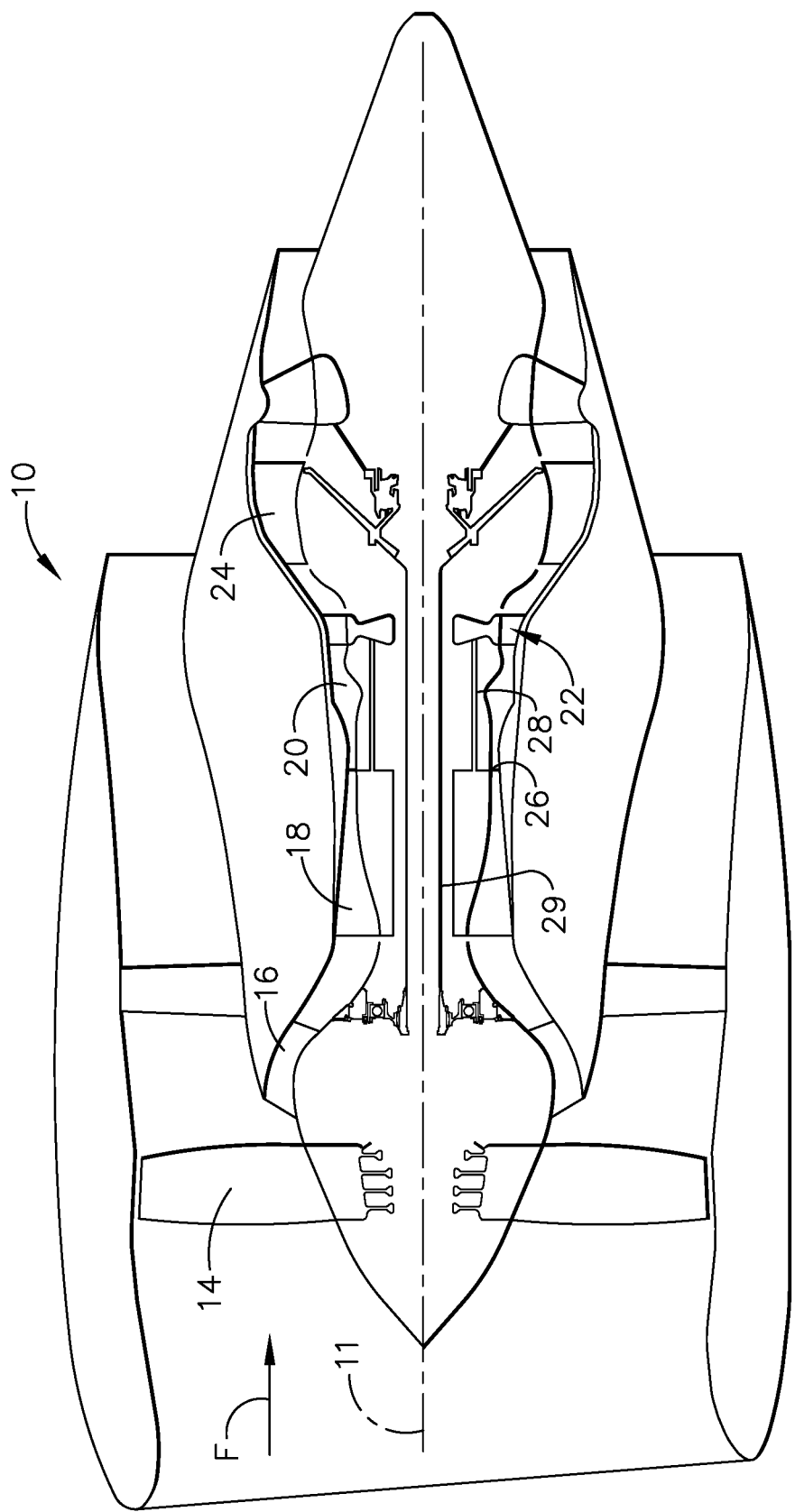
FIG. 1 is a cross-sectional, schematic view of a gas turbine engine that incorporates a compressor bleed apparatus.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines, such as low-bypass turbofans, turbojets, turboprops, etc., as well as turbine engines having any number of compressor-turbine spools. The engine 10 has a longitudinal center line or axis 11.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 14, booster 16, high-pressure compressor or "HPC" 18, combustor 20, high pressure turbine or "HPT" 22, and low pressure turbine or "LPT" 24 arranged in serial flow relationship. In operation, pressurized air from an exit 26 of the compressor 18 is mixed with fuel in the combustor 20 and ignited, thereby generating combustion gases. Some work is extracted from these gases by the high pressure turbine 22 which drives the compressor 18 via an outer shaft 28. The combustion gases then flow into the low pressure turbine 24, which drives the fan 14 and booster 16 via an inner shaft 29.

The compressor 18 includes a number of stages of blading; for example a typical compressor could include 6-14 stages. In operation, the static air pressure is incrementally increased by each subsequent compressor stage, with the final stage discharging air at the intended compressor discharge pressure ("CDP") for subsequent flow into the combustor 20. Each compressor stage represents the investment of incrementally more mechanical work. The illustrated example shows axial stages, but the principles described herein are also applicable to centrifugal or axi-centrifugal compressors. It is also noted that air may be bled or extracted from any portion of the compressor 18, or in fact any portion of the engine 10 upstream of the point at which fuel is introduced into the air flow. The concepts described herein are especially relevant to a structure for extracting or bleeding air from an intermediate location, that is at a stage upstream of the compressor exit 26.

Figure 2:
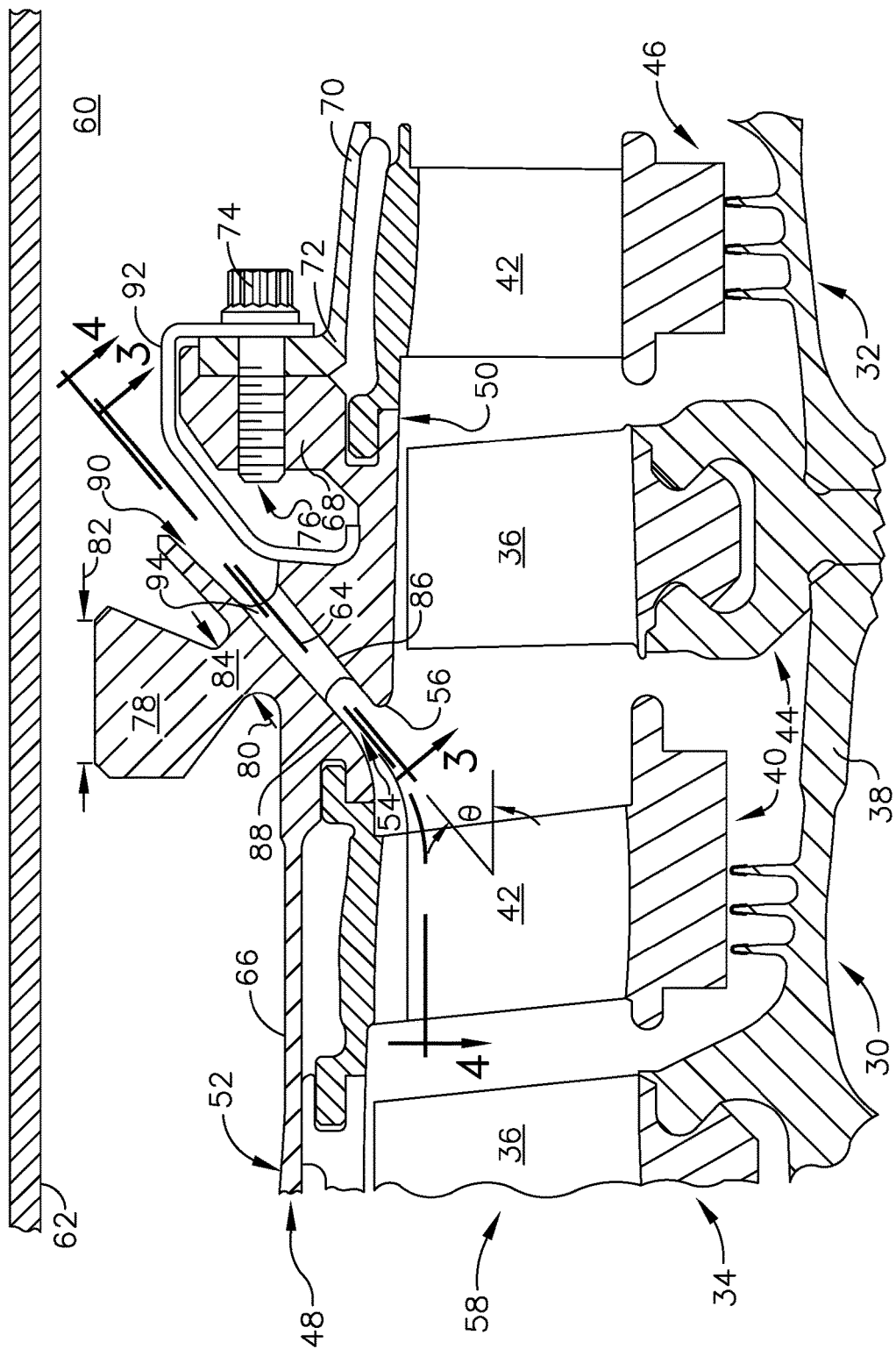
FIG. 2 is a schematic, half-sectional view of a portion of a compressor of the engine of FIG. 1.

FIG. 2 is a half-sectional view of a portion of the compressor 18 incorporating an exemplary embodiment of a flow extraction apparatus. Only two compressor stages are shown in FIG. 2. For the purposes of description, one of the stages will be referred to as an "upstream stage" 30 and the other stage will be referred to as a "downstream stage" 32, with the understanding that both of the upstream and downstream stages 30, 32 would be located upstream of the exit 26 of the compressor 18.

The upstream stage 30 includes a first blade row 34 of circumferentially-spaced airfoil-shaped rotor blades 36 mechanically coupled to a compressor rotor 38 which is in turn mechanically coupled to the outer shaft 28 described above, and a first stator row 40 of circumferentially-spaced, stationary airfoil-shaped stator vanes 42.

The downstream stage 32 includes a second blade row 44 of circumferentially-spaced airfoil-shaped rotor blades 36 mechanically coupled to the compressor rotor 38, and a second stator row 46 of circumferentially-spaced, stationary airfoil-shaped stator vanes 42.

The compressor 18 is surrounded by a compressor casing 48 that supports the stator vanes 42. The compressor casing 48 has a radially inboard surface 50 and an opposed radially outboard surface 52. The compressor casing 48 incorporates at least one bleed slot 54 passing through the thickness of the compressor casing 48. The bleed slot 54 may extend over all or a portion of the circumference of the compressor casing 48. In the illustrated example the single bleed slot 54 is a complete 360° slot. The bleed slot 54 defines an annular inlet 56 at the radially inboard surface 50. The illustrated axial position of the bleed slot 54 is merely an example.

During engine operation a portion of the compressed air from the primary flowpath 58 of the engine 10 enters the bleed slot 54 through the inlet 56 and passes into a bleed cavity 60 defined in part by an annular outer wall 62 (e.g. part of a manifold or outer casing) surrounding the compressor casing 48. Air entering the bleed cavity 60 can be redirected or transported as necessary for various end uses by means of appropriate conduits, valves, etc. (not shown).

The bleed slot 54 extends along a slot axis 64 which is disposed at a non-parallel, non-perpendicular angle $\theta$ to the centerline axis 11 of the engine 10. More particularly, the angle $\theta$ is selected to reduce pressure losses by turning bleed air through a lower angle as compared to prior art bleed slots (that are disposed in a nearly radial orientation). This feature may be referred to as a "flat" or "low-angle" bleed slot. As used herein, the term "low-angle" refers to an angle of about 65° or less. For example, the angle $\theta$ may lie in a range of about 30° to about 65°. In the illustrated example, the angle $\theta$ is about 37°.

The compressor casing 48 includes a forward section 66 which terminates in an annular, radially-extending first flange 68 at its aft end. The compressor casing 48 also includes an aft section 70 which terminates in an annular, radially-extending second flange 72 at its forward end. The first and second flanges 68, 72 abut each other and are clamped together by a plurality of fasteners such as the illustrated bolts 74 forming a bolted joint 76. The bolted joint 76 represents a significant amount of added mass and material thickness (measured in the radial direction), when compared to the average thickness of the compressor casing 48.

It is desirable to incorporate the low-angle bleed slot 54 without increasing the overall axial length of the engine 10. As can be seen in FIG. 2, this requires that the bleed slot 54 extend axially over the second blade row 44. Stated another way, at least a portion of the bleed slot 54 lies within the axial extents of the second blade row 44, these axial extents being defined by the axial positions of the leading and trailing edges of the rotor blades 36 of the second blade row 44. In the illustrated example, an outlet of the bleed slot 54 is positioned within the axial extents of the second blade row 44; it will be understood that the outlet could be positioned anywhere within the axial extents of the second blade row or aft of the second blade row 44. This configuration of the bleed slot 54 has the result of making the compressor casing 48 thinner in that area that would be the case in the prior art using a conventional bleed slot. In particular the bolted joint 76 is positioned downstream of the second blade row 44, whereas in the prior art it would be positioned directly radially outboard of the second blade row 44.

In operation, the stationary casing deflection (i.e. radial growth or shrinkage) is responsive primarily to heat flows. In operation, the rotor deflection is responsive both to heat flows and to centrifugal loads as the rotor speed changes. In general, the compressor casing 48 responds faster (both growth and shrinkage) than the rotor does, increasing the difficulty of maintaining desired radial clearances between the rotating and stationary components. The lack of casing thickness or mass caused by the incorporation of the low angle bleed slot 54 compounds the clearance problem.

In order to slow down the thermal response of the compressor casing 48, the compressor casing 48 incorporates a supplemental flange 78 disposed outboard of the bleed slot 54. The supplemental flange 78 is an annular ring which is integrally formed with the forward section 66 of the compressor casing 48. The supplemental flange 78 may be described as a "pseudo-flange" as it does not function to connect or mount components. At least a portion of the supplemental flange 78 is positioned within the axial extents of the bleed slot 54, these axial extents being defined by the axial positions of the inlet and the outlet of the bleed slot 54. Optionally, as an alternative to the integral ring-shaped structure shown in FIG. 2, the structure of the supplemental flange 78 could be defined by one or both flanges of an additional bolted joint (not shown).

In addition to providing additional mass, the supplemental flange 78 may optionally be shaped to slow down thermal response and improve weight efficiency. In the illustrated example, the supplemental flange 78 has a first thickness 80 (measured generally in the axial direction) at a radially inboard location where it adjoins the radially outboard surface 52 of the compressor casing 48. The supplemental flange 78 has a second thickness 82 (measured generally in the axial direction) measured at its radially outer periphery. The second thickness 82 is substantially greater than the first thickness 80. This physical configuration may be described as the supplemental flange 78 being "tapered" or of having a "neck" 84 of reduced axial thickness where it adjoins the radially outboard surface of the compressor casing 48. Specifically, the neck 84 provides a relatively small surface area for heat conduction from the remainder of the compressor casing 48 into the supplemental flange 78.

The bleed slot 54 is bounded by an inboard wall 86 and an opposed outboard wall 88, both of which are defined by the compressor casing 48.

The inboard wall 86 and the outboard wall 88 may be arranged to diverge away from each other as they extend radially outward. This provides an increased flow diffusion effect, increasing static pressure, as flow passes downstream through the bleed slot 54. The diffusion angle between the two walls 86, 88 may be selected to provide an appropriate diffusion rate while minimizing pressure losses.

A portion of the compressor casing 48 contiguous with the outboard wall 88 extends axially aft and radially outboard to define one wall of an annular extended diffuser 90. The other wall of the extended diffuser 90 is defined by an annular heat shield 92 which extends from the inboard wall 86 axially aft and radially outboard. An aft portion of the heat shield 92 curves inward to surround the bolted joint 76, and may be clamped therein by the fasteners 74 described above. The diffusion angle of the extended diffuser 90 may be selected to optimize aerodynamic performance and may be the same as or different from the diffusion angle of the bleed slot 54. Alternatively, the aft wall of the extended diffuser 90 could be defined by an extension of the compressor casing 48 as for the forward wall.

In the illustrated example, a circumferential array of structural struts 94 are disposed within the bleed slot 54, with spaces therebetween. Each strut 94 extends from a root at the inboard wall 86 to a tip at the outboard wall 88. By appropriate selection of their thickness, the struts 94 function to improve the structural stiffness of the compressor casing 48, control the channel width between surfaces 84 and 86, and may also control the throat area of the bleed slot 54.

Figure 3:
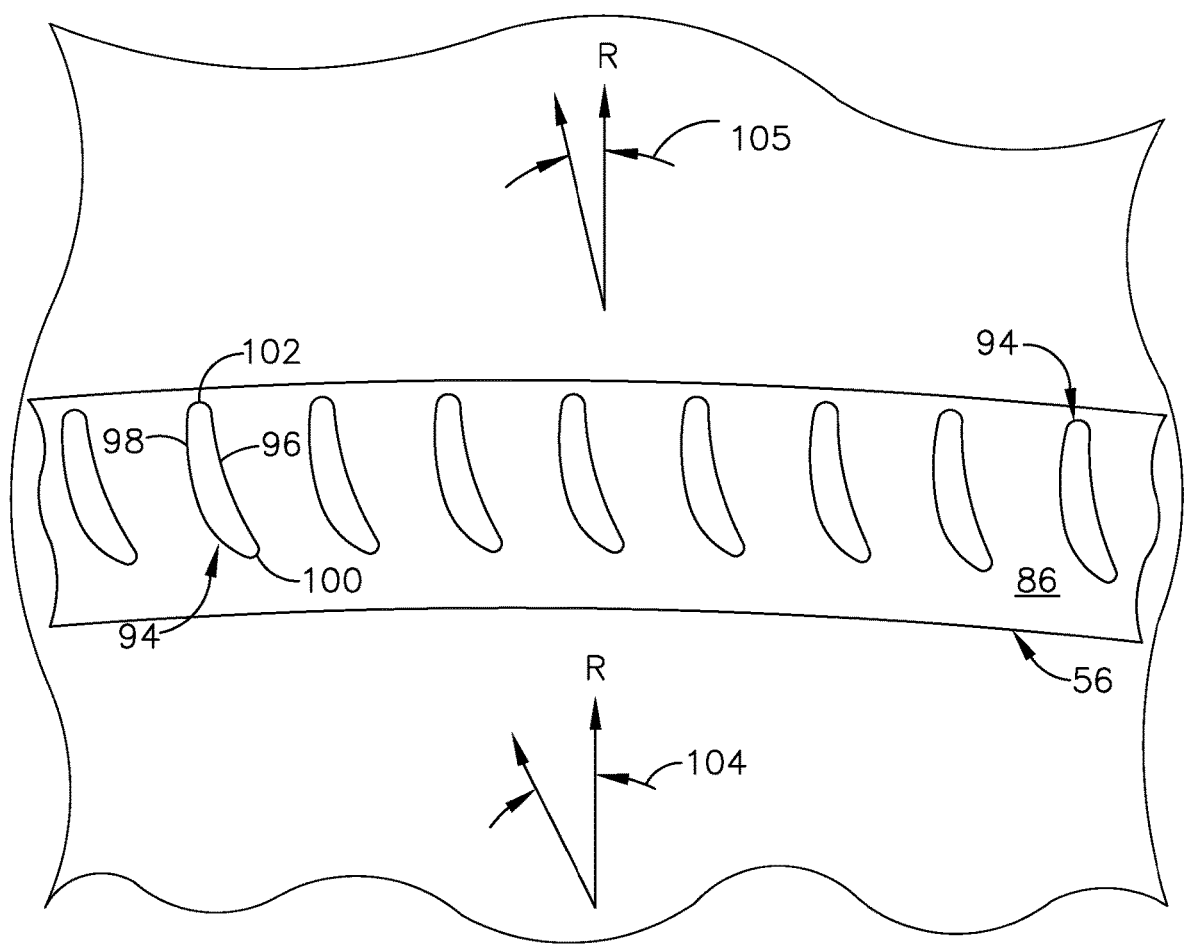
FIG. 3 is a view taken along lines 3-3 of FIG. 2.

In addition to the low-angle orientation described above, the performance of the bleed slot 54 may be further improved by the incorporation of a flow turning function to the struts 94. When configured to perform this function the struts 94 may be alternatively referred to as "turning vanes". In the illustrated example, the struts 94 are configured as airfoil-shaped turning vanes. Each strut 94 includes (see FIG. 3) a concave sidewall 96 joined to a convex sidewall 98 at a leading edge 100 and a trailing edge 102. When used solely or primarily for the flow turning function, the struts 94 (or turning vanes) need not interconnect the inboard and outboard walls 86 and 88; for example some or all of the turning vanes could be cantilevered from one of the walls.

Other shapes are possible for the struts 94. For example they may be configured as streamlined, staggered aerodynamic struts, similar to flat plates with rounded or tapered leading and trailing edges (not shown). Such struts may be disposed at a stagger angle similar to that shown for the struts 94 shown in FIG. 3. In general, any strut shape which is elongated (e.g. thickness/chord ratio less than 1), in combination with at least one of: (1) an orientation (i.e. stagger angle) resulting in a positive angle of attack during operation; and (2) a cambered cross-sectional shape, may function as a turning vane.

The struts 94 when configured as turning vanes, turn the flow passing through the bleed slot 54 in a tangential direction to reduce a tangential velocity (or tangential velocity component) of the flow, also referred to as "deswirling" the flow. The flow may be turned tangentially through a range of about 15° to about 30°. In one example the input tangential angle 104 is about 45° relative to radial direction "R", and the output tangential angle 105 is about 15° to about 20°.

The configuration of the struts 94, including characteristics such as their number, airfoil sectional shape, span dimension, chord dimension, thickness, and orientation may be selected using appropriate design tools to provide a desired degree of flow turning and diffusion with the least amount of pressure loss for a specific application and range of operational conditions which may tend to vary the bleed flow rate and incoming air angle 104. Optionally, the struts 94 may incorporate features associated with advanced computational fluid dynamics (CFD) analysis such as sweep, twist, bowing, or other 3-D aero features.

The combination of the struts 94 and the diffusing action of the bleed slot 54 improves bleed flow diffusion and reduces associated pressure losses. In one example the extended diffuser 90 described above may extend beyond the struts 94 a distance (measured along slot axis 64) of about 50% or more of the chord length of the struts 94; in another example the extended diffuser 90 may extend beyond the struts 94 a distance of about 100% or more of the chord length of the struts 94.

Figure 4:
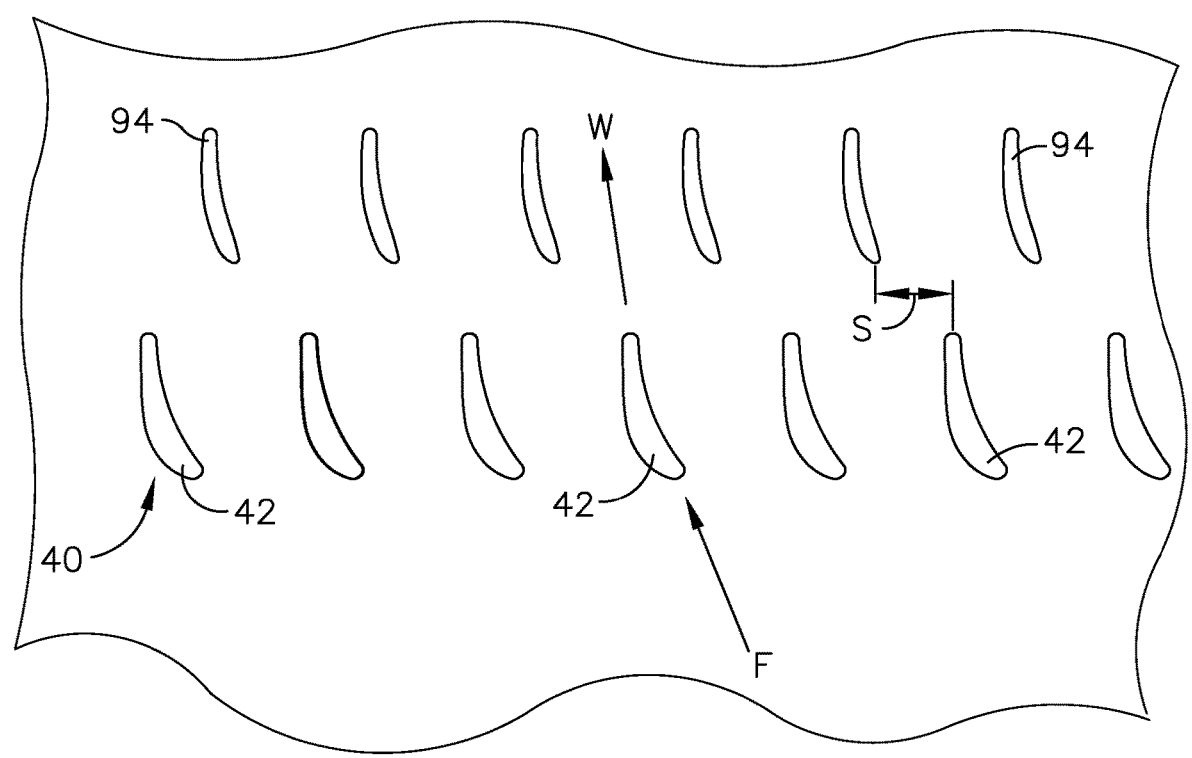
FIG. 4 is a schematic plan view of some of the airfoils of the compressor shown in FIG. 2, taken along lines 4-4 of FIG. 2.

An additional benefit may be derived by preferential clocking of the struts 94. The term "clocking" as used in the gas turbine field refers generally to the angular orientation of an annular array of airfoils, or more specifically to the relative angular orientation of two or more rows of airfoils. FIG. 4 illustrates schematically the first stator row 40, and the row of struts 94. The arrow marked "W" depicts the trailing edge wake from a stator vane 42, some of which travels a small distance downstream in the primary flowpath 58 before entering the bleed slot 54. The wake W represents the flow disturbance caused by the presence of the stator vane 42.

The individual rows of airfoils (stator vanes 42 or struts 94) are circumferentially spaced apart from each other in each row with an equal spacing represented by the pitch from airfoil-to-airfoil in each row. The circumferential pitch is approximately the same from the leading to trailing edges of the airfoils, with small variations driven only by changes in radius. The circumferential clocking between stator row 42 and the downstream turning vane row is represented by the circumferential distance "S" from the trailing edge of the stator vanes 42 relative to the leading edge of the downstream struts 94. This clocking or spacing S may be represented by the percentage of the downstream airfoil pitch. Using this nomenclature, zero percent and 100% would represent no circumferential spacing between the corresponding trailing and leading edges, and a 50% spacing would represent the trailing edge of the stator vanes 42 in the stator row 40 being aligned circumferentially midway between the leading edges of the struts 94 in the downstream row.

It is preferable to have the wake W pass between the downstream turning vanes 94. It should be noted that the absolute angular orientation of the stator row 40 or the struts 94 to a fixed reference is not important, that is, either airfoil row could be "clocked" relative to a baseline orientation in order to achieve the effect described herein.

In this specific example, best alignment of the wakes W and best aerodynamic efficiency, have been found when the angular position of the first stator row 40 is such that the wake W passes between the downstream turning vanes 94.

The bleed slot configuration described herein has advantages over the prior art. The combination of the struts 94 and other aerodynamic aspects of the bleed slot 54 improves bleed flow diffusion and reduces associated pressure losses. Analysis has shown that the reduction of pressure losses attributable to these features can permit the use of bleed air from a lower number stage of the compressor 18 (i.e. more upstream) than would otherwise be required using conventional bleed slot structures. The struts 94 will also improve the structural stiffness and control the throat area of the bleed slot 54.

Simultaneously, the incorporation of the supplemental flange 78 enables the use of the low-angle bleed slot 54 while limiting the axial length of the engine 10 and controlling the thermal response of the compressor casing 48, thus permitting proper internal clearances to be maintained.

The foregoing has described a bleed slot apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. For example, the bolted joint 76 described above could be replaced by an additional pseudo-flange similar to the supplemental flange 78 described above. This would be particularly applicable in a configuration where the compressor casing 48 is split longitudinally into two 180° halves instead of forward/aft sections, or is a single integral unit. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A compressor bleed slot apparatus, comprising:
   an annular compressor casing including an aft section connected to a forward section at a bolted joint;
   a stator vane row disposed inside the compressor casing;
   a blade row mounted for rotation about a centerline axis inside the compressor casing, axially downstream of the stator vane row;
   a bleed slot passing through the forward section of the compressor casing, axially upstream of the bolted joint, wherein the bleed slot is bounded by inboard and outboard walls defined within the compressor casing, the bleed slot having an inlet positioned axially between the stator vane row and the blade row, the bleed slot extending along a slot axis, at least a portion of the bleed slot lying within an axial extent of the blade row;
   an array of struts interconnecting the inboard and outboard walls; and
   an annular supplemental flange extending radially outward from the forward section of the compressor casing, wherein at least a portion of the supplemental flange is axially positioned within an axial extent of the bleed slot, wherein the supplemental flange is cantilevered and has a freestanding end and does not provide a connecting function to the casing aft section, and wherein the supplemental flange includes an enlarged portion at an outer periphery thereof, and a necked-down portion adjacent the forward section of the compressor casing, wherein the necked-down portion is positioned axially between the inlet of the bleed slot and an outlet of the bleed slot.

2. The apparatus of claim 1 wherein the supplemental flange includes a pair of spaced-apart faces defining a V-shape therebetween.

3. The apparatus of claim 1 wherein the slot axis is disposed at an angle of 65° or less relative to the centerline axis.

4. The apparatus of claim 1 wherein the slot axis is disposed at an angle of 30° to 65° relative to the centerline axis.

5. The apparatus of claim 1 wherein the slot has an outlet positioned within the axial extent of the blade row.

6. The apparatus of claim 5 wherein the inboard and outboard walls diverge from each other in a downstream direction relative to the bleed slot.

7. The apparatus of claim 6 further comprising an extended diffuser having divergent walls positioned downstream of the bleed slot.

8. The compressor bleed slot apparatus of claim 1, wherein the enlarged portion of the supplemental flange is radially spaced apart from an annular outer wall of the compressor casing.

9. The compressor bleed slot apparatus of claim 1, wherein the supplemental flange is positioned at an angle with respect to the bleed slot axis.

10. A gas turbine engine apparatus, comprising:
    a compressor, a combustor, and a turbine arranged in serial flow relationship, wherein the compressor includes:
    an annular compressor casing including an aft section connected to a forward section at a bolted joint;
    a stator row disposed inside the compressor casing;
    a blade row mounted for rotation about a centerline axis inside the compressor casing, axially downstream of the stator row, and mechanically coupled to the turbine;
    a bleed slot passing through the forward section of the compressor casing, axially upstream of the bolted joint, wherein the bleed slot is bounded by inboard and outboard walls defined within the forward section of the compressor casing, the bleed slot having an inlet positioned axially between the stator row and the blade row, the bleed slot extending along a slot axis, at least a portion of the bleed slot lying within an axial extent of the blade row;
    an array of struts interconnecting the inboard and outboard walls;
    and
    an annular supplemental flange extending radially outward from the forward section of the compressor casing, wherein at least a portion of the supplemental flange is axially positioned within an axial extent of the bleed slot, wherein the supplemental flange is cantilevered and has a freestanding end and does not provide a connecting function to the casing aft section, and wherein the supplemental flange includes an enlarged portion at an outer periphery thereof, and a necked-down portion adjacent the forward section of the compressor casing, wherein the necked-down portion is positioned axially between the inlet of the bleed slot and an outlet of the bleed slot.

11. The apparatus of claim 10 wherein the supplemental flange includes a pair of spaced-apart faces defining a V-shape therebetween.

12. The apparatus of claim 10 wherein the slot axis is disposed at an angle of 65° or less relative to the centerline axis.

13. The apparatus of claim 10 wherein the slot axis is disposed at an angle of 30° to 65° relative to the centerline axis.

14. The apparatus of claim 10 wherein the slot has an outlet positioned within the axial extent of the blade row.

15. The apparatus of claim 14 wherein the inboard and outboard walls diverge from each other in a downstream direction relative to the bleed slot.

16. The apparatus of claim 15 further comprising an extended diffuser having divergent walls positioned downstream of the bleed slot.

\* \* \* \* \*